June 15, 1943. W. D. DOOLEY 2,321,900
METHOD AND APPARATUS FOR GRADING EGGS
Filed Oct. 11, 1939 2 Sheets-Sheet 1
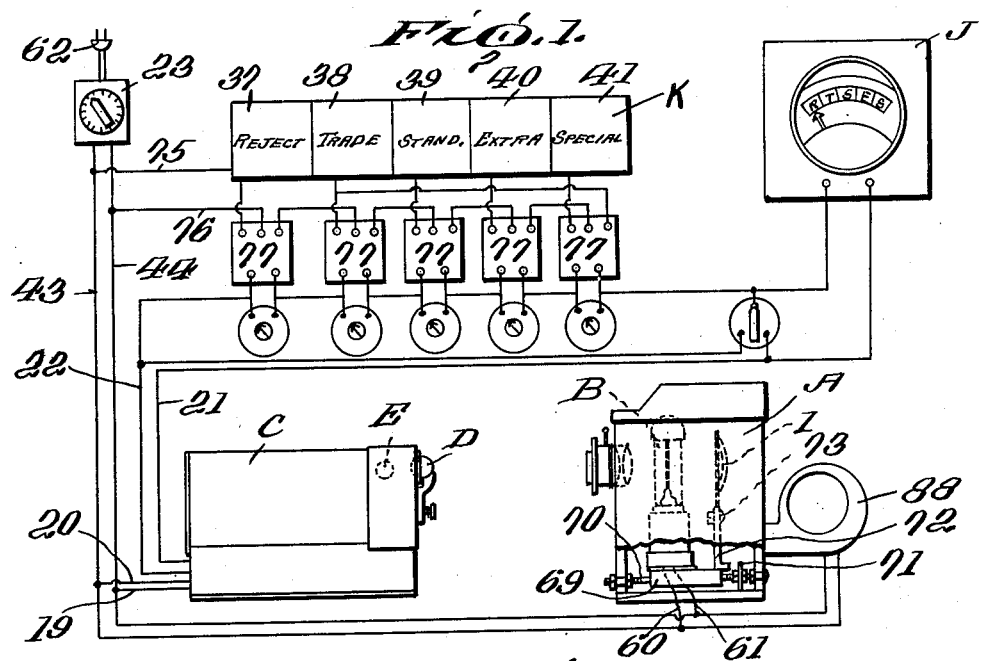
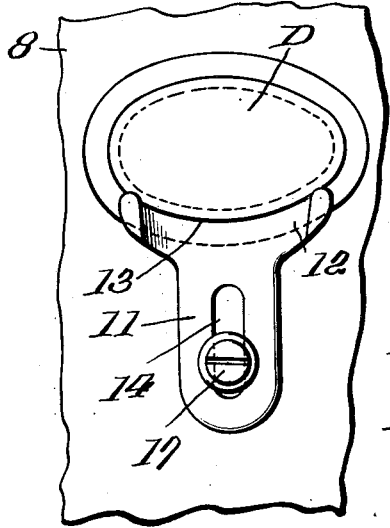
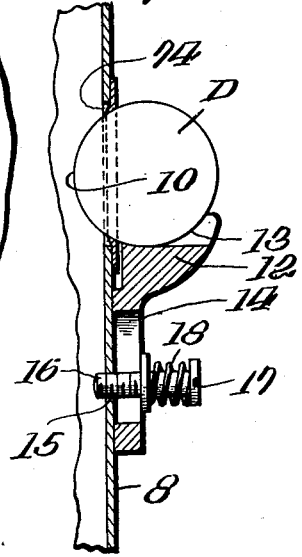
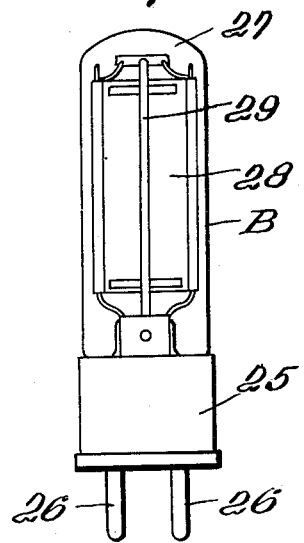
INVENTOR
W. D. Dooley
By
ATTORNEYS June 15, 1943.  W. D. DOOLEY  2,321,900
METHOD AND APPARATUS FOR GRADING EGGS
Filed Oct. 11, 1939  2 Sheets-Sheet 2
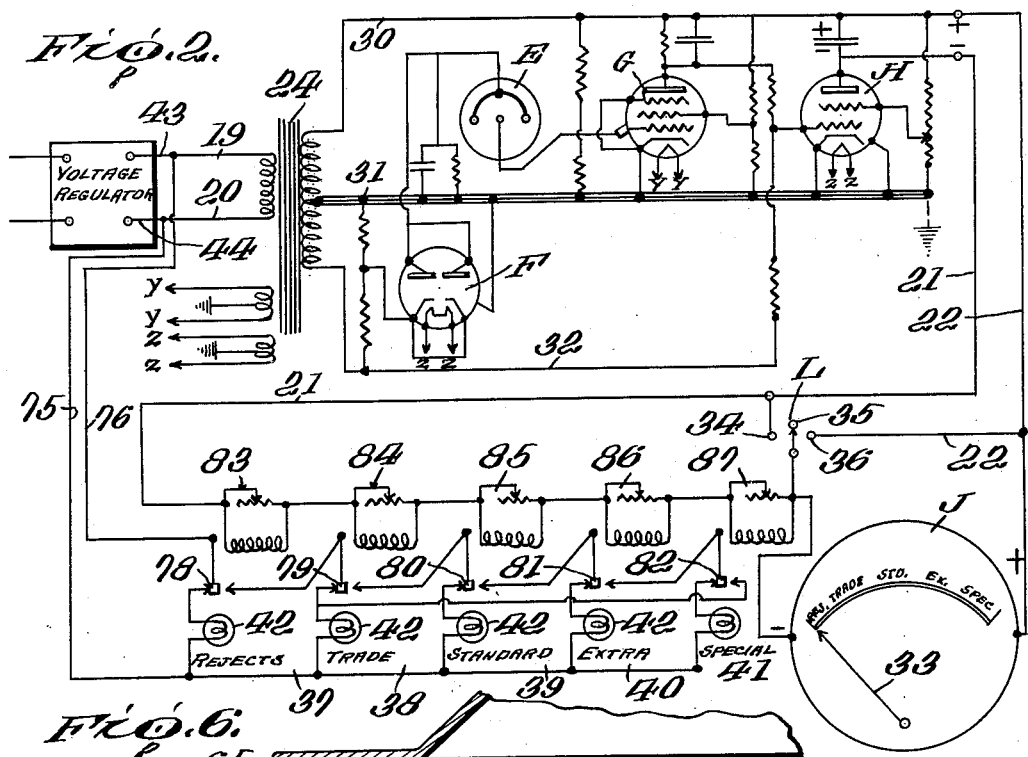
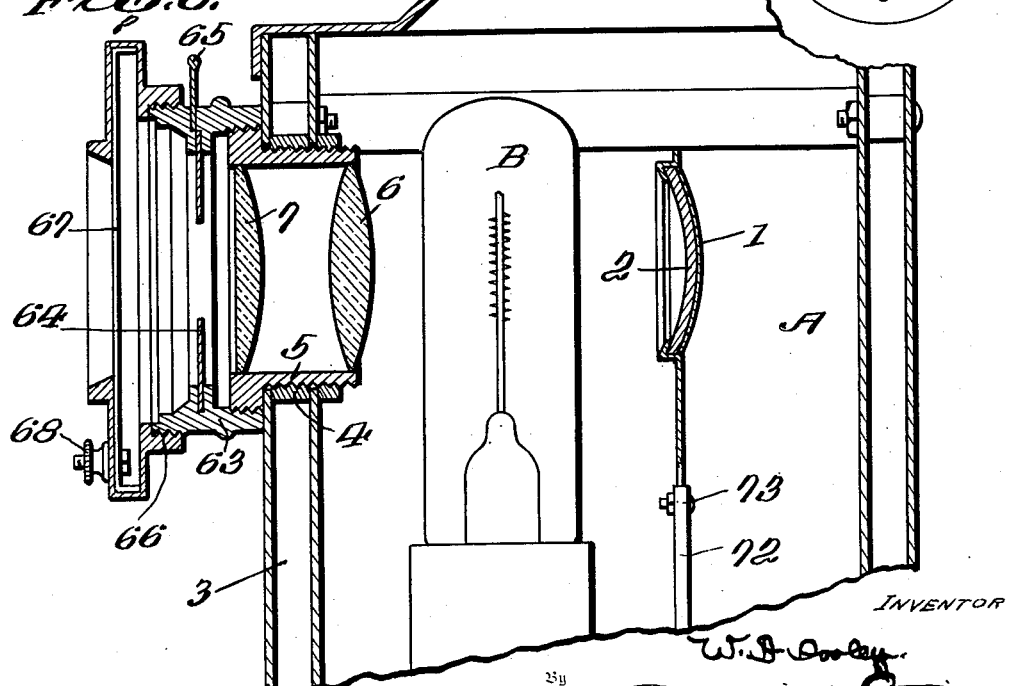
INVENTOR
W. D. Dooley
ATTORNEYS Patented June 15, 1943

2,321,900

UNITED STATES PATENT OFFICE 2,321,900

METHOD AND APPARATUS FOR GRADING EGGS

William D. Dooley, Springfield, Ohio

Application October 11, 1939, Serial No. 299,026

11 Claims. (Cl. 88—14.1)

This invention relates to an improved method and apparatus for grading eggs, and has been conceived and designed to provide a means whereby eggs can be accurately as well as rapidly separated or classified in accordance with the true interior quality of the egg.

Egg grading machines and methods have been known and used in the past and for the most part are referred to as "candlers," but if not so referred to they for the most part operate on the candling principle whereby the egg is visually examined in front of a light source. Whatever the prior machine or method used I have found that the grading of the eggs has been extremely inaccurate. In actual tests which I have conducted on eggs graded by the different methods now known to me I have found among the cheaper and rejected eggs, eggs which properly should be classified as good or better eggs and have found among the so-called "select" eggs many eggs which should have been classified lower or actually rejected. The percentage of error in the grading of eggs by prior methods and machines has been astonishingly great, and the primary object of the present invention is that of providing a method and apparatus by the use of which the eggs are graded accurately in all instances and all eggs in each grade when classified by my method are found to be identical in quality.

Those familiar with the handling and sale of eggs know that many eggs are sold under Government supervision in respect to grading. The grades into which eggs are classified and approved as thus classified are "special," "extra," "standard," "trade" and "rejects." This makes in all five classes or grades of eggs with the "special" of course being the top or best and most expensive grade of egg while the "rejects" are bad eggs not suitable for market use.

Another object of the present invention is the provision of an apparatus and method by which eggs can be rapidly and accurately graded or sorted into these five standard grades with an absolute assurance that each egg when broken open has an interior quality which properly places it in the grade to which it has been assigned. With this accurate sorting or grading of the eggs everyone from the poultry farmer or chicken and egg raiser to the ultimate consumer is assured of receiving full value. The purchaser or housewife when buying more expensive eggs will be assured that she is getting the best eggs while the producer who handles his chickens on a scientific basis to obtain the best eggs will be assured of a fair return for his efforts. This has not proven to be the case in the past due to the inaccurate way in which eggs have been classified.

In producing the apparatus and carrying out the method of the present improved invention novel features of construction as well as a novel mode of operation have been conceived the spec'fic natures of which will be pointed out in detail in the following description.

Among the novel arrangements is that of the specific electric circuit utilized as well as the specific detector tube or cell utilized in said circuit. Also the visual indicating means which enables the operator to immediately determine the particular class in which an egg belongs is novel both in construction and operation. The particular light source and the method of transmitting and utilizing the invisible rays or radiant energy waves are also novel, as is likewise the manner of supporting each individual egg for examination or test.

Broadly the invention consists of a method utilizing an electrical apparatus in combination with a radiant energy generating source and determining through or by absorption the interior quality of an egg.

The condition or state of what is commonly referred to as the white or albumen of an egg is the primary determining factor in classifying or grading eggs. By repeatedly breaking and examining both Government candled or classified eggs as well as independently candled or classified eggs as well as unclassified eggs I have determined that the best grade of eggs is that in which the white or albumen is the most viscous, that is to say, in the best grade of eggs the white is firm and as the quality of the egg depreciates the white or albumen becomes thinner with the result that in the poorer grade of eggs a greater proportion or volume of the egg white is thin or watery than is the case in the best or higher grade of eggs.

Other considerations which should be considered in grading eggs are those of whether or not the egg has been previously incubated or preheated and as to whether or not the egg yolks contain meat spots or the egg yolks are mottled.

By and through repeated tests and experimentation I have found that by subjecting an egg to, that is, projecting through an egg waves of radiant energy a specific wave length of the energy will be absorbed by the interior contents of the egg in direct proportion to the state or condition of the egg white or albumen. I have found that in the case of "special" eggs which are the highest grade, there is practically no absorption of the specific wave length of energy which I utilize in connection with my apparatus in practicing my improved method. An "extra" quality eggs absorbs a small proportion or amount of the specific wave length. In connection with a "standard" quality egg which is the next down the scale, absorption of the specific wave length of energy used is approximately twice that which occurs in an "extra" quality egg. In a "trade" quality egg the absorption is approximately twice that which occurs in a "standard" quality egg. In unedible or "reject" eggs which are eggs which have been incubated for short periods or eggs in which the process of decomposition has progressed, or eggs in which the white or albumen has lost practically all its thick consistency or viscosity, or eggs in which the yolks are mottled or contain meat spots, the degree of absorption of the energy waves by the interior content of the egg is excessive in amount and so much greater than the degree of absorption of the other classes of eggs as to make absorption of a "reject" egg easily determinable.

Expressed in another way, I have found that in a "special" egg the white or albumen which has lost its firm consistency has a mean average of only ten to fifteen percent of the total volume of the egg white; that in an egg of "extra" quality the proportion of the egg white which has lost its firm consistency has a mean average of between fifteen and twenty-five percent of the total volume of the egg white; in a "standard" grade egg the proportion of the albumen which has lost its firm consistency will reach between twenty-five and forty-five percent of the total volume of egg white; in a "trade" class of egg the volume of the egg white which has lost its firmness will run between fifty and seventy percent, and in a "reject" or unedible egg the proportion of white which has lost its firm consistency will run from seventy to as high as ninety percent of the total volume of the egg white.

From the foregoing it will be seen that by projecting through the egg radiant energy of a wave length which will be absorbed by the egg white or albumen in proportion to the state of consistency of the egg white or albumen and providing an apparatus to measure or determine the degree of absorption of the energy, eggs can be accurately classified or sorted into classes or groups in accordance with the interior quality of the egg.

However the specific radiant energy waves and apparatus utilized and the method practiced must be such that the egg shell is eliminated entirely as a factor from the standpoint of absorption of radiant energy. In devices with which I am familiar in which light or radiant energy is utilized in an effort to determine the quality of an egg, I have found that they are inaccurate to such a high degree as to be practically useless by reason of the fact that the shell structure when different, as it is in practically all eggs, is a very major factor and causes the improper grading of the eggs. It will be readily recognized that some eggs have thin while other eggs have thick shells and I have found that this has caused all egg graders with which I am familiar to be inaccurate in determining the quality of the egg under test. Some such devices with which I am familiar are dependent upon the passing of light or radiant energy through the egg and the measurement of the light or radiant energy passed is made by photoelectric means, but these devices when testing two eggs having the same identical interior qualities will invariably grade the egg with the thick shell into a lower grade than the egg with the thin shell.

In view of the above in my method the egg shell is eliminated entirely as a factor which could possibly cause erroneous grading.

From the foregoing it will be understood that in carrying out the invention radiant energy waves of a specific nature generated from a radiant energy source of a specific nature are projected through the egg and that the radiant energy between energy waves of certain specific lengths is absorbed by the interior contents of the egg in proportion to the interior quality of the egg and that the degree of absorption of the radiant energy is detected by an electrical mechanism which comprises an electric circuit including a radiant energy responsive cell of a specific nature in combination with amplifier tubes. It will be further understood that the detector tube or radiant energy responsive cell and the amplifier tubes operate or function to operate or actuate a meter, annunciator or the like through the medium of which the user of the machine is at once visually advised as to the quality of the egg being tested and the particular class into which it should be placed or sorted.

Having indicated broadly the objects and novel features of the invention as well as expressed broadly the mode of operation thereof, specific description will now be given of one embodiment which the apparatus may take as illustrated in the accompanying drawings, it being understood however that the apparatus need not follow specifically that illustrated in the drawings and that the apparatus could be made to function automatically to a greater degree than that illustrated and herein described without departing from the spirit of the invention.

In the drawings:

Fig. 1 is a plan or diagrammatic view illustrating an apparatus suitable to practice the present improved method.

Fig. 2 is a diagrammatic lay-out of the electric circuit utilized in practicing the method.

Fig. 3 is a front view of the egg support.

Fig. 4 is a vertical sectional view through Fig. 3.

Fig. 5 is a front view of the detector tube or cell.

Fig. 6 is an enlarged fragmentary view in vertical section of the light box or housing.

In the specific apparatus illustrated in the drawings as constituting one form which the same may take to enable the practice of the present improved method, and referring specifically to Figure 1 of the drawings, A designates a lamp box or housing within which is disposed a light source B which in this instance is in the form of an electric filament light current for which is obtained over the main input electric wires or conductors 43 and 44 through the take-off wires 60 and 61 respectively. The input wires or lines 43 and 44 are connected with a voltage regulator 23, the exact nature of which will hereinafter appear, which regulator is connected to a source of current supply, not shown, by a suitable plug 62 or the like.

The particular light utilized generates or radiates radiant energy waves of lengths from 3500 angstrom units, which is at the lower end of the ultraviolet spectrum, on through the visible spectrum which lies between four thousand to seven thousand four hundred angstrom units, and up into the infra-red spectrum to a wave length of forty thousand angstrom units. The peak of radiation of the light occurs between eight and nine thousand angstrom units.

The electric light B which has the characteristic of radiating the above referred to lengths of radiant energy waves is a standard General Electric Company T-10 projection lamp with a tungsten filament temperature of three thousand degrees Kelvin.

Behind the light B is placed a parabolic reflecting lens 1 and its concave surface is preferably provided with a pure silver reflecting surface 2 which has been electrolytically deposited thereon to a depth of three ten-thousandths of an inch. A reflector of this type will not absorb the long wave lengths of radiant energy which are essential, as will hereinafter more clearly appear, in the practice of the present invention. Furthermore the reflecting surface will not check or crack due to expansion and contraction of the reflector by reason of its being subjected to the heat generated by the closely adjacent light source.

By reference particularly to Figure 6 of the drawings it will be seen that the front wall 3 of the lamp box is provided with an opening defined by an internally threaded ring 4 within which is threadedly mounted a carrier 5 within which in turn are mounted in spaced relationship a calcite lens 6 and a fluorite lens 7. Externally of the housing the carrier 5 is threaded to receive and support a ring 63 within which is positioned an iris diaphragm 64 which is adjustable through the medium of a conveniently positioned lever or operating handle 65. A second ring 66 is threadedly mounted on the first ring 63 and carries a normally closed shutter 67 which is operable by a handle 68.

By reference to Figure 1 of the drawings it will be seen that the electric light and reflector are mounted on a common base 69 which by reason of a shaft 70 threadable in the front wall 3 of the lamp box and threadedly adjustable in a bracket 71 makes it possible to adjust the light and reflector forwardly and rearwardly in respect to the lenses. The reflector is adjustable vertically on a bracket 72 through a nut or the like 73. The base of the reflector bracket 72 is adjustable transversely of the main base 69.

The construction just described permits the necessary adjustments to make it possible to obtain correct alignment to image the light filament on the eggs as will hereinafter more fully appear. It is highly desirable to magnify the filament image of the light on the egg so as to reduce to a minimum energy loss in the color temperature of the light filament.

Referring to Figure 1 of the drawings, C designates a box or housing within which is contained the electric circuit including the radiant energy responsive cell or detector tube as well as the amplifier tubes illustrated in Figure 2 of the drawings. In the practice of the invention the box or housing is positioned so that an opening 74 in the front wall or end 8 of the box is in horizontal alignment with the light outlet opening of the lamp box.

An egg is designated at D and by reference to Figures 1 and 4 of the drawings it will be seen that the opening 74 in the housing C is such that when the egg is disposed with its long axis in a horizontal plane and extending transversely of the front 8 of the box a portion of the egg designated as 10 extends through the box opening into the interior thereof.

To facilitate the positioning and support of eggs for examination and test and to accommodate the support to eggs of varying sizes, I have provided a novel egg supporting mechanism. The egg supporting mechanism comprises an arm 11 having on its upper end an enlargement or head 12 having a concave shaped upper face 13 adapted to engage an egg in the manner clearly illustrated in Figures 3 and 4 of the drawings. The arm 11 is provided with an elongated slot 14 through which projects the shank 15 of a screw which is threadedly secured as at 16 in the front wall 8 of the box C. The outer end of the screw shank 15 is provided with a head 17 under which is disposed a coil spring 18 which exerts a pressure or tension upon the arm 11. The construction is such that the egg supporting arm can through the application of a little force or pressure thereon be readily moved vertically on the front face 8 of the box yet the tension of the spring 18 is sufficient to maintain the egg supporting arm in whatever position it may be moved into to accommodate eggs of varying or different sizes. In operation the egg can be placed in the box opening 74 and the supporting arm moved upwardly until the head thereof engages the under side of the egg to support it. The weight of the egg is not sufficient to overcome the tension of the coil spring 18 and as a consequence the egg will remain supported on the arm and within the box opening in the manner illustrated in Figure 4 of the drawings.

Referring to Figure 1 of the drawings the input current supplying lines to the circuit and tubes within the box C are designated at 19 and 20 and are connected to a 115 volt, 60 cycle source of current supply. The output lines of the circuit from the box or housing are designated at 21 and 22 and lead to one or more electrical devices for automatically indicating the grade or classification of the egg under test, as will appear more clearly and specifically from the hereinafter following description.

Referring now to Figure 2 of the drawings, and it being understood that the electric circuit and tubes now to be described are within the housing box C, it will be seen that the current supply lines 19 and 20 are connected to a voltage regulator 23 and from there extend to or through a transformer 24. Detailed description wire by wire and connection by connection of the electric circuit is deemed unnecessary as Figure 2 of the drawings renders the circuit entirely clear to anyone skilled in the art.

A radiant energy responsive cell is designated at E and this cell is further illustrated in detail in Figure 5 of the drawings. This cell is positioned within the box or housing C immediately behind the opening 74 in the front wall thereof and immediately behind the egg D as is clearly illustrated in dotted lines in Figure 1 of the drawings. By so positioning the cell the radiant energy waves or spectral energy which pass through the egg and into the housing through the front opening thereof are directed upon the cell.

Investigation reveals that none of the cells now on the market and available are suitable for or usable in practicing the present invention. The cell E is peaked to be responsive to radiant energy of the long wave lengths which lie between 14,000 and 40,000 angstrom units which are the particular wave lengths which are absorbed by the white or albumen of an egg, and by eggs which have been preheated, or by eggs the yolks of which are mottled or upon which are meat spots. The cell is relatively unresponsive to other wave lengths. No cell which I found to be available had these necessary characteristics. I found that cells which are obtainable and available for use had their plates coated with caesium and were not suited for my use and would not operate as required with the result that I have produced a cell of my own creation and which so far as I know is novel in construction.

The cell E comprises a base 25 having the usual and ordinary electrical contact points or prongs 26. Upon this base is supported a glass tube or envelope 27 which tube is made of a high grade Crown or Jena glass. The glass ordinarily employed in ordinary cells is not suitable for use in the present invention as it would absorb more of the long wave lengths used to determine the interior quality of the egg than it would pass. Additionally the glass tube or envelope is evacuated beyond the ordinary vacuum found or used in the ordinary type of cell. The tube or envelope contains a nonconducting inert gas and I have found argon, xenon, or krypton to be gases suitable for use in my cell. Within the tube there is a cathode 28 and an anode 29. The cathode plate is semi-cylindrical in form and is coated with rubidium which gives to the cell the hereinbefore referred to peculiar and particular characteristic that it is peaked to be responsive only to radiant energy the wave length of which is between 14,000 and 40,000 angstrom units which is the particular spectral energy which is absorbed by that portion of the interior content of the egg which determines the interior quality of the egg.

In combination with the cell I utilize three tubes which are standard in radio use and which may be purchased in any radio store. These tubes in the particular circuit illustrated are used to amplify the output energy of the cell. One of the three tubes is designated at F and is commonly referred to in the trade as a 6H6 tube. A second of the tubes is designated at G and is commonly referred to as a 6C6 tube, while the third tube is designated at H and is known and commonly referred to as a 6L6 tube.

Although the circuit utilized will be clearly understandable to those skilled in the art the circuit is unique and original with me. It was found impossible to use the conventional type of rectified direct current high gain or balance type of amplifier because my amplifier must be one whose sensitivity would be responsive to one part in a million.

To those skilled in the art it will be recognized that the extreme evacuation of my cell or detector tube is obtained for the purpose of reducing to the minimum air in the tube, the presence of which would tend to retard or absorb the minute amount of energy which is utilized to energize the cell.

At this point attention is also called again to the fact that the cell is not responsive to visible light or to radiant energy in any other wave lengths than those heretofore specified and that impression of visible light or radiant energy in other wave lengths than those specified will result in no signal output or response from my cell.

Those skilled in the art will understand that the radiant energy responsive cell is peaked for maximum response to the specified wave lengths of energy and that actually the cell will respond to other wave lengths but such response is so weak as to be inconsequential.

It might be pointed out in connection with the electric circuit that the main leads from the transformer are 30, 31 and 32. The manner of connection of these leads with the detector and amplifying tubes is obvious and it is equally obvious that the take-offs YY from the transformer lead to the contacts YY of the tube G while the take-offs ZZ are electrically connected to the contacts ZZ of the two amplifying tubes F and H.

In the embodiment of the invention illustrated in the drawings both a meter and what I have termed an annunciator are provided to enable the user or operator of the apparatus to determine immediately the grade or classification of the egg being tested or scanned. As will be explained, a switch is provided so that the meter only can be used if desired. It is recognized that other specific instrumentalities could be utilized by which the operator of the apparatus could determine the classification of the egg under test but the mechanism I have provided is particularly suitable. Additionally it is to be recognized that the output lines 21 and 22 could be used in combination with and to actuate a mechanical mechanism so that eggs could be carried past and through the radiant energy waves or rays, such as on an endless belt, and be removed therefrom for delivery into specific bins or the like in accordance with the particular classification of the egg. In other words, having provided a mechanism and method for determining the quality of an egg this mechanism could be used in combination with many varied kinds of instrumentalities which would automatically deliver the eggs, after test, into a collector or bin provided for each class of egg.

Having reference now to Figure 2 of the drawings, J designates an electrical meter having a conventional pointer 33 which moves over a dial or scale having indicia thereon indicating five classes of eggs. This meter is electrically connected to the output wires or lines 21 and 22 through the annunciator box K or the annunciator box can be eliminated by manipulation of the switch L, which switch also makes it possible to eliminate the meter and use the annunciator box only. When the switch is closed on the contact 34 the meter only is in the circuit; when the switch is on the contact 35 both the meter and the annunciator are in the circuit, while with the switch on the contact 36 the annunciator only is in the circuit. The annunciator can be in practically any form but in Figure 1 it is illustrated as comprising a plurality of boxes or housings 37, 38, 39, 40 and 41 within each of which is positioned an electric light 42. There are five boxes which provides one for each grade of egg and the boxes will be provided with a transparent covering having thereon the name of one of the grades or classifications of eggs. When, as will be hereinafter explained, an egg under test proves to be a "special" egg the light in box 41 will be illuminated and thus advise visually the particular classification of the egg.

Current for the lights 42 is brought to the annunciator over the wires 75 and 76 which are connected to the current inputs 43 and 44. There is an individual relay 77 for each of the lights in each of the annunciator boxes 37 to 41 inclusive and these relays are connected to a conductor 76 and to one another in series as is clearly illustrated in the drawings. Each of the lights 42 in the annunciator box are connected directly to the conductor 75. The relays are polarized and are for the purpose of operating the switches 78, 79, 80, 81 and 82 which are provided in the conductor 76 one each being for the electric light in each of the annunciator boxes 37 to 41 inclusive.

The output lines 21 and 22 from the amplifying circuit are connected to five individual variable shunts designated as 83, 84, 85, 86 and 87 one of which is provided for use in connection with each of the five heretofore mentioned polarized relays.

It will be understood from the foregoing description that the particular wave length of radiant energy utilized in determining the interior quality of the egg is absorbed in the greatest amount by a "reject" egg, in a lesser amount by a "trade" egg, a still lesser amount by a "standard" egg, and so on up the scale until "special" eggs are reached and here the degree of absorption of the spectral energy is practically nil. The arrangement is such that when the degree of absorption of an egg under test is in the amount which would grade the egg as a "standard" egg only the light in the "Standard" box 39 of the indicator will be illuminated. In a like manner if the egg under test were a "special" only the light in the indicator box 41 behind the word "Special" would be illuminated.

When the switch L is manipulated or set to include the meter J in the circuit the pointer 33 will point to that portion of the meter dial or scale indicating the particular grade of egg which is under test.

The variable shunts 83 to 87 provide an adjustable control by which the relays can be set to operate at any predetermined strength or volume of signal or energy output over the output conductors 21 and 22 of the amplifying and detecting circuit.

From the foregoing it will be seen that the method and apparatus operate to determine the interior quality of an egg by determining the degree of absorption, by the interior contents of the egg, of the radiant energy lying within a specific wave length or wave band which length is in or at the infrared end of the spectrum. Accordingly it can be said that the present method and apparatus is one by which the quality of an egg is determined by spectroscopic analysis.

From the foregoing description it will be further understood that the degree of absorption of radiant energy increases and the strength or amount of current passed in the circuit by the cell decreases as the proportion or amount of the thin or watery or less viscous portion of the egg white or albumen increases. It will be equally as obvious that the meter can be easily calibrated in accordance with the current output of the circuit to correctly indicate the class in which the egg under test should be classified. It will also be equally obvious that the polarized relays together with their shunts can be equally well calibrated so that only the proper light to properly indicate the true classification of the egg will be illuminated. For the purpose of cooling the interior of the light box or housing and thereby reducing the likelihood of injury to the reflector and lenses I have provided an electrically driven fan 88. The drive motor of this fan is electrically connected to the main current input lines 43 and 44 as clearly appears in Figure 1 of the drawings.

Additionally it is to be understood that although I have illustrated and described electrical means for indicating the quality of the eggs under test the signal output could be equally well utilized to actuate some mechanical means or instrumentality to indicate the quality of each egg as it undergoes test.

The present invention is therefore to be limited only within the scope of the hereinafter appended claims.

I claim:

1. In an egg grading machine, a light source and a radiant energy responsive element in spaced relation thereto, a vertically disposed wall between said light source and element and provided with an opening for the reception of a portion of an egg and to permit passage of radiant energy waves from said light source onto said element, said wall opening having a shape closely approximating the cross sectional shape of an egg on the longitudinal axis of the egg, a support for supporting an egg with its longitudinal axis parallel to the longer dimension of said wall opening so that a portion of the egg extends into said wall opening in a direction toward said element, said egg support being movably mounted on said wall for vertical movement toward and away from said opening in a direction transverse the longer dimension of the opening to permit eggs of varying cross sectional dimension transverse their longitudinal axis to be positioned with the greatest possible portion of the egg projecting through said opening, and quickly operable means for yieldably holding said egg support in any of its adjusted positions.

2. A construction such as defined in claim 1 wherein, the means for holding the egg support in its adjusted position is automatic in operation to maintain the support in any of its adjusted positions.

3. A construction such as defined in claim 1 wherein, the egg support is held in any of its adjusted positions under resilient tension which permits the support to be readily moved at will by the application of pressure or force which is sufficient to overcome said resilient tension.

4. The method of determining by spectrum absorption analysis the quality of an egg without breaking or impairing the egg in any regard whatsoever, consisting in projecting through the egg radiant energy waves of lengths which will be absorbed by the thin or watery part of the egg white or albumen, finding the amount of absorption by the thin or watery part of the egg albumen of said radiant energy waves in said wave lengths, and then comparing said absorption finding with known standards of absorption of said lengths of radiant energy waves of eggs of known qualities.

5. The method of determining by spectrum absorption analysis the quality of an egg without breaking or impairing the egg in any regard whatsoever, consisting in projecting through the egg radiant energy waves of lengths from 14,000 to 40,000 angstrom units, ascertaining the amount of radiant energy in said wave lengths which is absorbed by the interior contents of the egg, and then comparing said absorption finding with known standards of absorption of said lengths of radiant energy waves of eggs of known qualities.

6. The method of determining by spectrum absorption analysis the quality of an egg without breaking or impairing the egg in any regard whatsoever, consisting in projecting through an egg radiant energy in lengths from 14,000 to 40,000 angstrom units, positioning a radiant energy responsive cell which is peaked for response only to radiant energy of said stated specific wave lengths in a position behind said egg to be in the path of travel of the radiant energy waves which pass through said egg, associating in electrical connection with said cell an electric circuit including a source of current supply therefor, causing said cell to permit the flow of current in said electric circuit only when said cell is activated in response to said radiant energy waves which pass through said egg, amplifying in said circuit the current permitted to be passed therein by said cell, utilizing the amplified current output of said circuit to actuate a signal device in accordance with the strength of said circuit current output, and calibrating said signal device with the known current output of said circuit for eggs of known quality so that said signal device will indicate the quality of the egg being tested.

7. The method of determining the quality of an egg without breaking or impairing the egg in any regard whatsoever, consisting in projecting through the egg radiant energy waves of lengths which will be absorbed by the thin or watery part of the egg white or albumen, finding by spectrum absorption analysis the proportion or percent of the total volume of the egg white which is thin or watery by ascertaining the amount of radiant energy in said wave lengths which is absorbed by the white or albumen portion of said egg and then comparing said absorption finding with the known standards of absorption of said lengths of radiant energy waves of eggs of known qualities.

8. The method of determining the quality of an egg without breaking or impairing the egg in any regard whatsoever, consisting in projecting through said egg radiant energy waves of lengths falling within the absorption band of the thin or watery part of an egg white or albumen, finding by spectrum absorption analysis the proportion or percent of the total volume of the egg white which is thin or watery by ascertaining the amount of radiant energy in said wave lengths which is absorbed by said portions of the egg, and making said finding by: positioning a radiant energy responsive cell having a peak responsive curve in said absorption band so that the radiant energy waves which pass through said egg will fall upon the cell, providing an electric circuit and a source of alternating current supply therefor, coupling said cell in said circuit to act as a variable resistance to permit the passage of current in said circuit only when said cell is activated and in large or small amounts in accord with the degree of activation of the cell, providing means actuated by the current output of said circuit to indicate the strength of said current output, and calibrating the response of said means to known standards of the response of said means in respect to eggs of varying qualities so that said means will indicate the quality of any egg under test.

9. An egg grading apparatus comprising, a light source which generates radiant energy waves of lengths from 14,000 to 40,000 angstrom units, a radiant energy responsive cell constructed to respond only to radiant energy waves of the specified lengths, a support for supporting an egg between said light source and said cell, means to project radiant energy waves through said egg and upon said cell, an electric circuit including a source of alternating current supply, said cell being electrically connected in said circuit and acting to permit the passage of current therethrough only when said cell is activated by said specified radiant energy waves, means in said circuit for amplifying the current output which said cell permits in said circuit, a series of indicators actuatable in response to the current output of said circuit and each adapted to indicate an egg of different quality, and each of said indicators being calibrated with the known standard of an egg of the quality said indicator is adapted to designate, whereby the operation of each indicator is brought about only when the current output of said circuit is of a known and predetermined amount so that the operation of an indicator will properly and accurately designate the quality of an egg under test.

10. An apparatus such as defined in claim 9 wherein, the means for projecting the radiant energy waves generated by the light source is such as not to absorb any of the radiant energy waves of lengths between 14,000 and 40,000 angstrom units.

11. The method of determining the quality of an egg without breaking or impairing the egg in any regard whatsoever, consisting in projecting through said egg radiant energy waves of lengths from 14,000 to 40,000 angstrom units, finding by spectrum absorption analysis the proportion or percent of the total volume of the egg white which is thin or watery by ascertaining the amount of radiant energy in said wave lengths which is absorbed by said portions of the egg, and making said finding by: positioning a radiant energy responsive cell having a peak responsive curve in said wave lengths so that the radiant energy waves which pass through said egg will fall upon the cell, providing an electric circuit and a source of alternating current supply therefor, coupling said cell in said circuit to act as a variable resistance to permit the passage of current in said circuit only when said cell is activated and in large or small amounts in accord with the degree of activation of the cell, providing means actuated by the current output of said circuit to indicate the strength of said current output, and calibrating the response of said means to known standards of the response of said means in respect to eggs of varying qualities so that said means will indicate the quality of any egg under test.

WILLIAM D. DOOLEY.